United States Patent
Brumley

(10) Patent No.: US 6,792,158 B1
(45) Date of Patent: Sep. 14, 2004

(54) SYSTEM AND METHOD FOR IMAGE ENHANCEMENT

(75) Inventor: Wilson E Brumley, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/429,145

(22) Filed: Oct. 28, 1999

(51) Int. Cl.⁷ ............................. G06K 9/40; G09G 5/00
(52) U.S. Cl. ....................... 382/254; 345/156; 345/502
(58) Field of Search ................................ 382/100, 254, 382/274, 275, 276, 282, 299; 235/462.01; 250/201.9; 345/156, 502, 442, 581; 348/57; 358/3.27, 447, 500

(56) References Cited

U.S. PATENT DOCUMENTS

| | | | | |
|---|---|---|---|---|
| 4,833,625 A | * | 5/1989 | Fisher et al. ................. | 345/668 |
| 5,109,348 A | * | 4/1992 | Pfeiffer et al. ............... | 345/505 |
| 5,257,097 A | * | 10/1993 | Pineau et al. ................ | 358/500 |
| 5,307,180 A | * | 4/1994 | Williams et al. ............. | 358/448 |
| 5,563,720 A | * | 10/1996 | Edgar et al. ................. | 358/447 |
| 5,568,571 A | * | 10/1996 | Willis et al. ................. | 382/254 |
| 5,636,036 A | * | 6/1997 | Ashbey .......................... | 386/8 |
| 5,652,663 A | | 7/1997 | Zelten ......................... | 358/447 |
| 5,652,851 A | * | 7/1997 | Stone et al. ................. | 345/804 |
| 5,828,461 A | | 10/1998 | Kubo et al. .................. | 358/296 |
| 5,844,542 A | | 12/1998 | Inoue et al. ................. | 345/594 |
| 5,930,009 A | | 7/1999 | Sato et al. ................... | 358/518 |
| 6,690,356 B2 | * | 2/2004 | Johnston et al. ............ | 345/157 |

OTHER PUBLICATIONS

Bradley, John, "XV Interactive Image Display for the X Window System", (XP002228397), pp. 33–44, Published on Dec. 29, 1994.

European Search Report, Application No. EP 00 11 2170, dated Feb. 10, 2003.

* cited by examiner

*Primary Examiner*—Jayanti K. Patel

(57) ABSTRACT

A system and method are provided for digital image enhancement. In one example of an embodiment, the system includes a processor and a memory that are electrically coupled to a local interface that may be, for example, a data bus and associated control bus. The system also includes a display electrically coupled to the local interface through a display interface. Stored in the memory and executed by the processor is image enhancement logic. The image enhancement logic includes logic to generate a user interface displaying a digital image and at least one image parameter adjustment mechanism. The image enhancement also includes logic to adjust at least one image parameter of the digital image in response to a manipulation of the image parameter adjustment mechanism, thereby altering the digital image displayed in the user interface.

12 Claims, 5 Drawing Sheets

SYSTEM AND METHOD FOR IMAGE ENHANCEMENT

TECHNICAL FIELD

The present invention is generally related to the field of electronic image processing, and, more particularly, is related to a system and method for electronic digital image enhancement.

BACKGROUND OF THE INVENTION

More and more, electronic digital technology is extending its reach into various aspects of human existence. More recently, scanning technology and digital photography have gained widespread use. In particular, now an average user can take a photograph with a digital camera and then download the resulting image into a suitable processing system for display and storage, etc., the image being in a digital form that comprises a number of digital data values.

While such technology helps solve problems of storage of images and maintaining the quality of the images over time as opposed to images on degradable film or paper, etc., in typical imaging software, the digital images may not be altered or enhanced. Furthermore, in some cases, the images may not be of the best quality due to imperfections in the manner that they were acquired, for example, due to problems inherent with many digital cameras or with the scanning technology.

In other situations, users may wish to alter the appearance of an image to suit particular purposes. For example, some images may be used in advertising or for display in some manner, etc. In such cases, users may wish to enhance various attributes of a digital image and detract from others.

SUMMARY OF THE INVENTION

In light of the foregoing, the present invention provides a system and method for digital image enhancement. In one embodiment, the system of the present invention includes a processor and a memory that are electrically coupled to a local interface that may be, for example, a data bus and associated control bus. The system also includes a display electrically coupled to the local interface through a display interface. Stored in the memory and executed by the processor is image enhancement logic. The image enhancement logic includes logic to generate a user interface displaying a digital image and at least one image parameter adjustment mechanism. The image enhancement also includes logic to adjust at least one image parameter of the digital image in response to a manipulation of the image parameter adjustment mechanism, thereby altering the digital image displayed in the user interface.

In other embodiments, the image enhancement logic may be implemented in hardware, software, firmware, or a combination thereof. One hardware implementation includes, for example, a dedicated logical circuit comprised of a network of logical gates and other components.

The present invention can also be viewed as providing a method for digital image enhancement. In this regard, the method can be broadly summarized by the following steps: generating a user interface displaying a digital image and at least one image parameter adjustment mechanism, and, adjusting at least one image parameter of the digital image in response to a manipulation of the image parameter adjustment mechanism, thereby altering the digital image displayed in the user interface.

The present invention provides advantages in that it provides flexibility for the user who can easily manipulate image controls to alter the appearance of a digital image as they see fit based upon the user's particular purpose.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
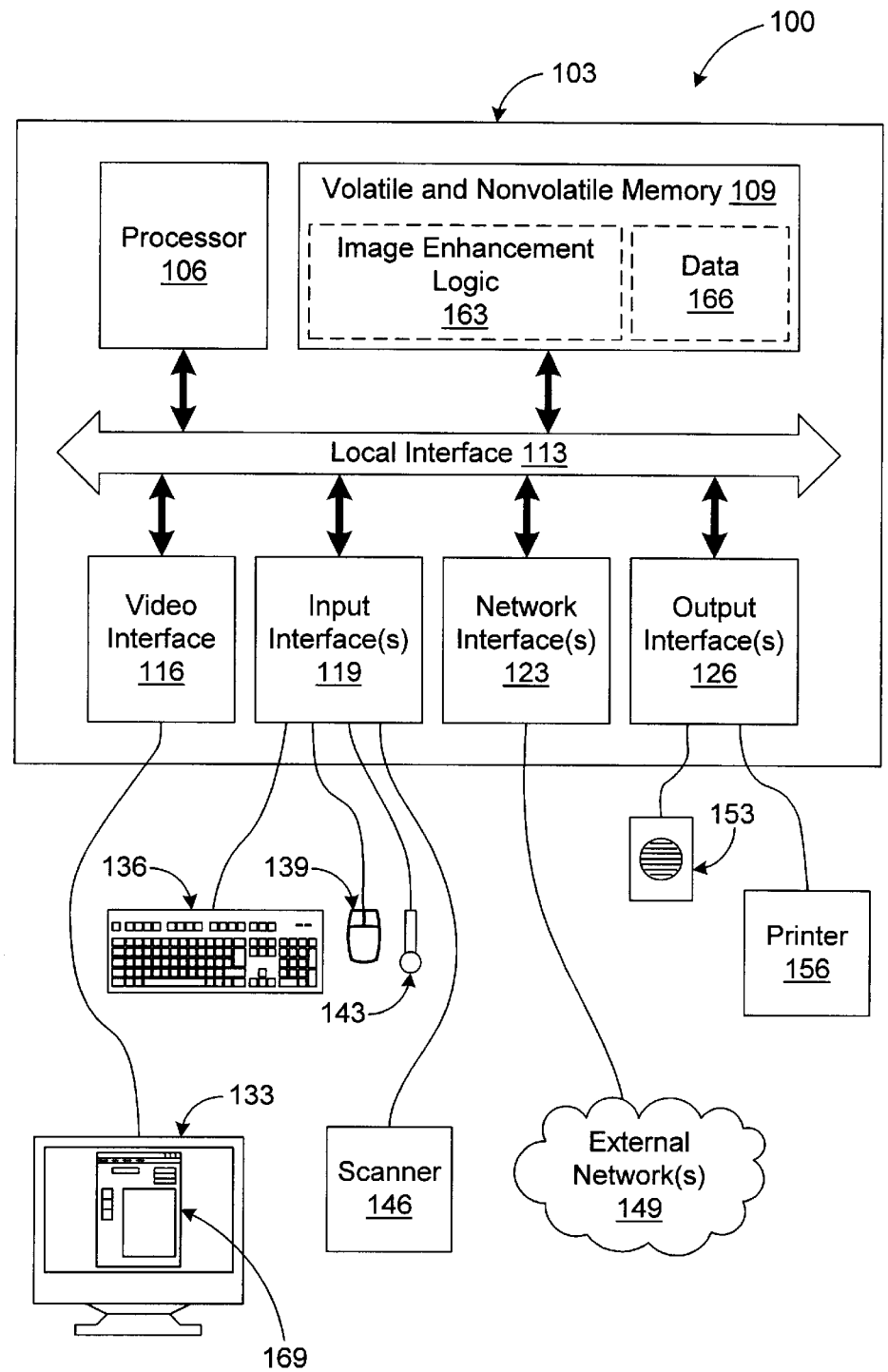
FIG. 1 is a block diagram of a digital image enhancement system according to an embodiment of the present invention.

Referring to FIG. 1, shown is a block diagram of an image enhancement system 100 according to an embodiment of the present invention. The image enhancement system 100 includes a computer system 103 which comprises a processor 106 and a volatile/nonvolatile memory 109, both of which are coupled to a local interface 113. The local interface 113 may include, for example, one or more data busses along with corresponding control busses, or local multiple processor network in the case of parallel processing systems. The computer system 103 further comprises a display interface 116, at least one input interface 119, at least one network interface 123, and one or more output interfaces 126, all of which are also coupled to the local interface 113.

The volatile/nonvolatile memory 109 may include, for example, random access memory (RAM), read-only memory (ROM), a hard drive, a combination compact disk drive with a compact disk, a combination floppy disk drive with a floppy disk, or other suitable data storage device. With respect to the memory 109, the term "volatile" refers to those memory devices that do not maintain data during a loss of power, whereas the term "nonvolatile" refers to those devices that maintain data during a loss of power.

The image enhancement system 100 also includes a display device 133 that is coupled to the local interface 113 through the video interface 116. The display device 133 may be any of a variety of well known display devices, such as, for example, a cathode ray tube (CRT), a liquid crystal display screen, a gas plasma-based flat panel display, indicator lights, light emitting diodes, and other display elements.

Also, the image enhancement system 100 features any one or a combination of several input devices, namely, a keyboard 136, a mouse 139, a microphone 143, and a scanner 146 which are all coupled to the local interface 113 through the various input interfaces 119. In addition, the local interface 113 may be coupled to at least one external network(s) 149 such as a local area network (LAN), a wide area network (WAN), the Internet, or other such network via the network interface(s) 123. In this regard, the network interface(s) 123 may comprise a suitable modem, interface card, or other suitable device. Thus, the computer system 103 may receive and transmit data via external network(s) 149 by way of the network interfaces(s) 123.

The image enhancement system 100 may further include audio speakers 153, a printer 156, or other output devices that are coupled to the local interface 113 via the output interfaces 126. The image enhancement system 100 also includes image enhancement logic 163 that is generally stored in the memory 109 along with a digital image 166. For purposes of the discussion that follows, a digital image 166 is defined as an image that is embodied in digital data that may be accessed by the processor 106 and depicted on the display device 133 or generated by the printer 156, or an image that is digitally encoded and stored in a computer memory.

When the image enhancement system 100 is operational, the processor 106 generally executes the image enhancement logic 163. For example, during operation of the image enhancement system 100, the image enhancement logic 163 may be loaded from a nonvolatile memory source such as a hard drive to RAM where it is directly accessible to the processor 106 for various purposes as will be discussed. The image enhancement logic 163 also includes logic to generate a user interface 169 on the display device 133 that provides a user with the means to manipulate various image controls that vary one or more image parameters of a digital image depicted thereon. The various image controls include, but are not limited to, scenery, flesh tone, portrait attributes, sunrise/sunset, brightness, contrast, sharpness, color red, yellow, blue, green, and other similar controls.

Figure 2:
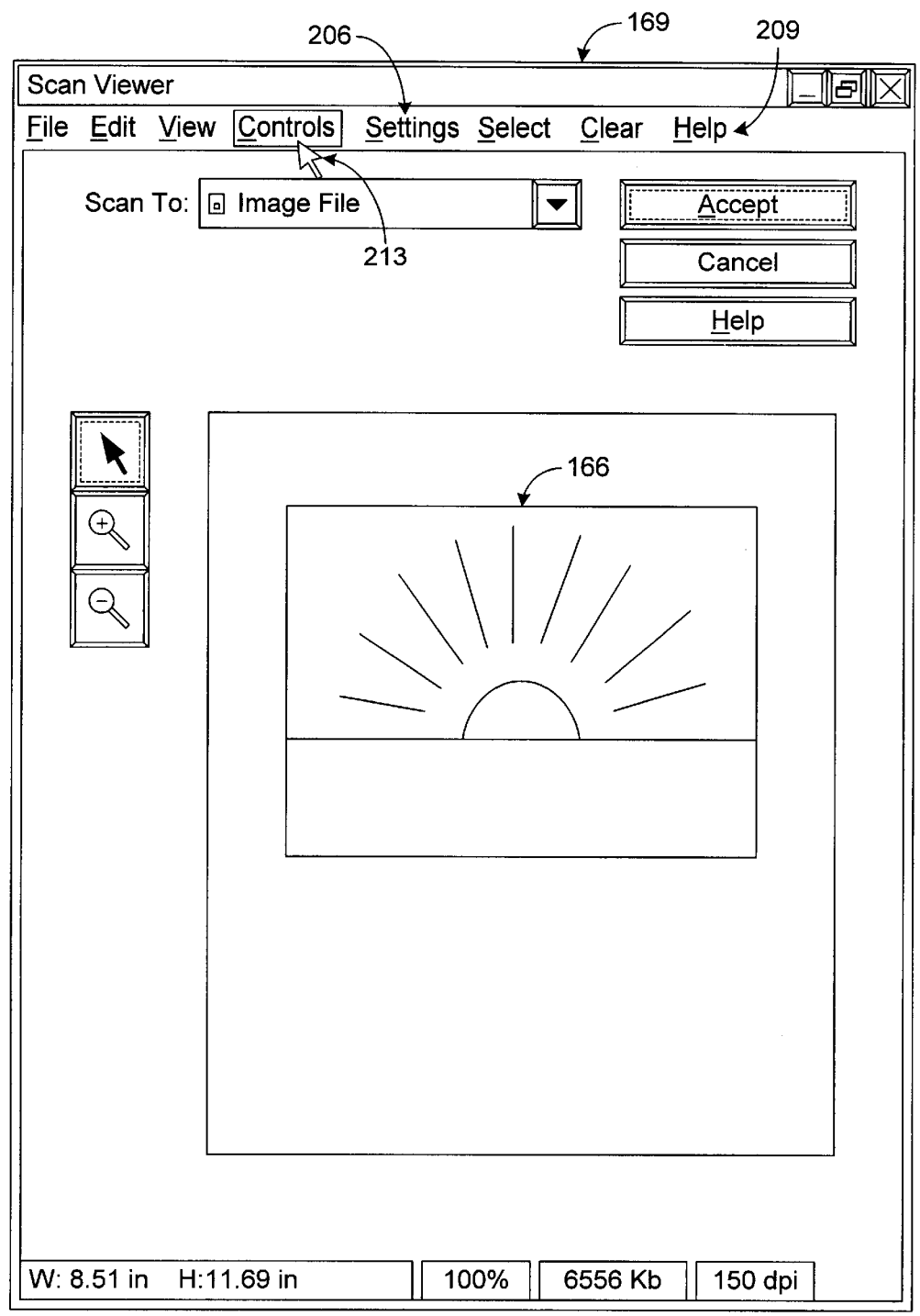
FIG. 2 is a drawing of a user interface employed in the digital image enhancement system of FIG. 1.

With reference to FIG. 2, shown is the user interface 169 according to an embodiment of the present invention. The user interface 169 preferably facilitates the display of the digital image 166. The digital image 166 is stored in the memory 109 (FIG. 1) and accessed by the image enhancement logic 163 to be displayed on the display device 133 as part of the user interface 169. Note that the digital image 166 may be downloaded to the memory 109 from the scanner 146 (FIG. 1) or via the network 149 (FIG. 1). Also, the digital image 166 may be downloaded into the memory 109 from a digital camera or other capture device through appropriate interfaces (not shown). In addition, the digital image 166 may be stored on a nonvolatile memory device such as a floppy disk that is placed in a floppy disk drive of the computer system 103 (FIG. 1) and accessed by the processor 106 pursuant to the image enhancement logic 163. Generally, accessing the digital image 166 as such is an expedient known to those skilled in the art and not discussed in detail herein.

The user interface 169 further includes a number of menu items 206 on a menu bar 209 that can be manipulated using a cursor 213. In particular, the cursor 213 may be positioned over the menu items 206 using the mouse 139, and then depressed using the button on the mouse 139. This is referred to as "clicking" on a particular menu item 206. By clicking on a particular menu item 206, a drop down menu falls from the menu bar 209 pertaining to the particular menu item 206.

Figure 3:
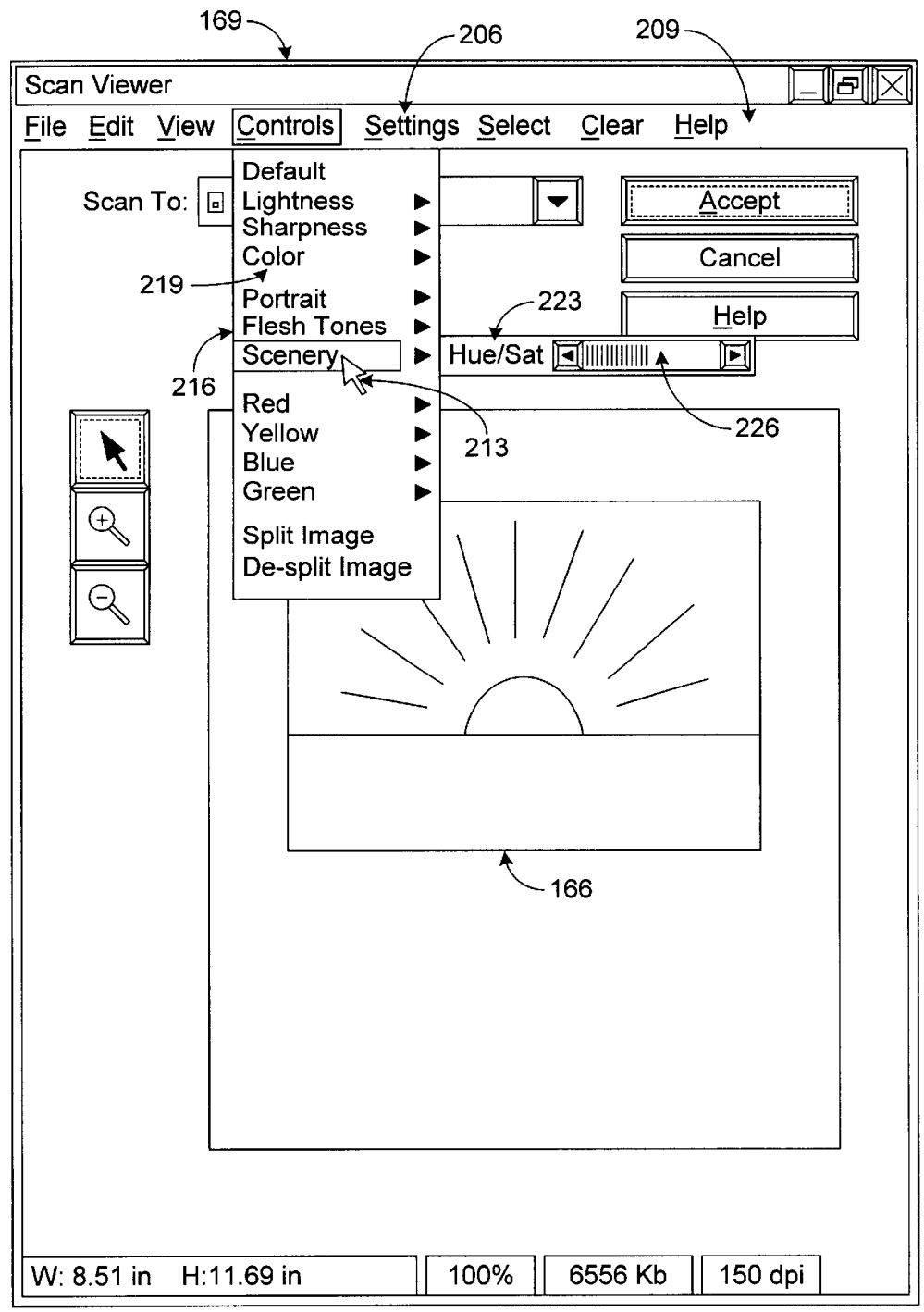
FIG. 3 is a further drawing of the user interface of FIG. 2.

With reference to FIG. 3, shown is a second view of the user interface 169 upon clicking on the "controls" menu item 206. Clicking on the "controls" menu item 206 causes a "controls" drop down menu 216 to appear. The "controls" drop down menu 216 lists a number of image controls 219 as shown. The image controls 219 include, for example, but not limited to, default, lightness, sharpness, color, portrait, flesh tones, scenery, red, yellow, blue, green, split image, and de-split image or other like image controls. Associated with the lightness, sharpness, color, portrait, flesh tones, scenery, red, yellow, blue, and green image controls 219 is at least one image parameter 223 that may be adjusted with an appropriate adjustment mechanism 226. The adjustment mechanism 226 includes, for example, a slide bar with adjustment pushbuttons at either end so that it may be easily manipulated by a user. The adjustment mechanism 226 may also include any other device, such as a knob or other indicator.

The following includes a discussion of the actual image parameters 223 that may be adjusted for each of the image controls. Note that some image controls 219 enable the adjustment of multiple image parameters 223 while some allow the adjustment of a single image parameter 223. In some cases, the same image parameter 223 may be associated with one or more image controls. Note that it is preferable that only the adjustment mechanisms 226 that relate to a single image control 219 be shown at a time. In this sense, adjustment mechanisms 226 appear when the user clicks on the corresponding the image control 219.

First, the "Scenery" image control 219 generally causes an adjustment mechanism 226 to appear that facilitates the adjustment of the blue and green spectrums of the digital image 166. These image parameters are associated with the scenery image control 219 as they relate to the blue of the sky and the green of most trees and foliage. These colors are generally stored in the memory of individuals as most people see them every day. The multiple image parameters that can be adjusted with respect to the blue and green spectrums of the scenery control are the hue and saturation. The hue refers to the particular tint of the color itself, whereas the saturation refers to the amount or intensity of the color in the digital image 166.

When the user clicks on the "Flesh Tones" image control 219, an adjustment mechanism appears that facilitates the adjustment of multiple image parameters, including the hue and saturation of the colors of flesh tones. The "Portrait" image control 219 enables the adjustment of the sharpness or focus of the digital image 166.

The "Lightness" image control 219 enables an adjustment mechanism 226 to adjust multiple image parameters, including the brightness and contrast of the digital image 166. The "Sharpness" image control 219 enables an adjustment mechanism 226 to adjust the image parameter 223 of the sharpness or focus of the digital image 166, making it either softer or more distinct. The "Color" image control enables an adjustment mechanism 226 that allows one to increase or reduce the amount of color displayed in the digital image 166. Finally, the "Red," "Yellow," "Blue," and "Green" image controls 219 all enable adjustment mechanisms 226 to adjust the image parameters 223 of hue and saturation for each of these colors. Note that other colors may be included as well. Although not listed in the "controls" drop down menu 216, other image controls 219 may be employed as well, such as a "sunrise/sunset" image control 223 that enables an adjustment mechanism 226 for multiple image parameters 223, including the hue and saturation in the orange and red spectrums as well as the brightness of the digital image.

Also, a "Default" image control 219 is included that allows a user to reestablish the original condition of the digital image 116 after it has been altered using any of the above image controls 219. In particular, the user simply clicks on the default image control 219 to reset the state of the digital image 166 accordingly.

Finally, the "Split" and "De-split" image controls 219 allow the user to cause multiple copies of the digital image 166 to appear that may be adjusted individually using any of the image controls 219 discussed above. For example, upon clicking on the "split image" image control 219, three of the digital images 166 appear side by side. A user may highlight any one of the three digital images 166 by clicking thereon and then may alter the various image controls relative to the highlighted digital image 166. The highlighted digital image 166 becomes the only digital image if one clicks on the "De-split Image" image control 219, accordingly.

The adjustment of the image parameters according to the present invention provides distinct advantages. In particular, a user can alter an image to change its appearance to better suit a predefined purpose of the user. For example, in some cases, certain colors or other attributes of the digital image 166 are preferably enhanced or diminished to make them easier to interpret by users, etc. In addition, the image controls 219 are easily manipulated by the average user.

Figure 4:
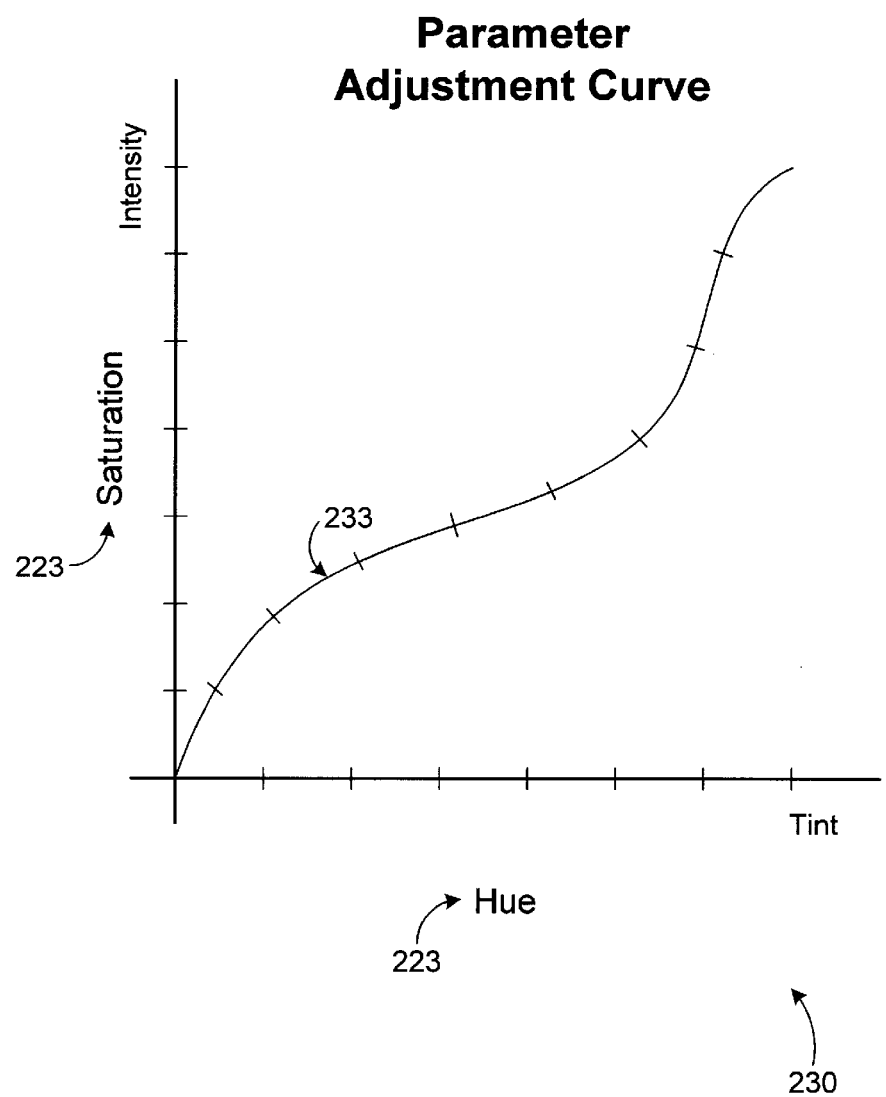
FIG. 4 is a graph (hue vs. saturation) of an image parameter adjustment curve employed in the digital enhancement system of FIG. 1.

Turning to FIG. 4, shown is a graph 230 of a multiple parameter adjustment curve 233 according to an embodiment of the present invention. The multiple parameter adjustment curve 233 illustrates the adjustment, for example, of two image parameters 223 that are associated with a single adjustment mechanism 226 (FIG. 3). In particular, the position of the adjustment mechanism 226 corresponds to a particular position on the multiple parameter adjustment curve 233. Thus, by moving the adjustment mechanism 226, the user may adjust both image parameters 223 according to the multiple parameter adjustment curve 233 as shown. The multiple parameter adjustment curve 233 may be stored in the memory 109 as part of the image enhancement logic 163. The particular magnitude or other quality of the relevant image parameter 223 may be adjusted in the digital image (FIG. 2) by drawing an association between the current position of the respective adjustment parameter 226 and the same position on the multiple parameter adjustment curve 233.

Figure 5:
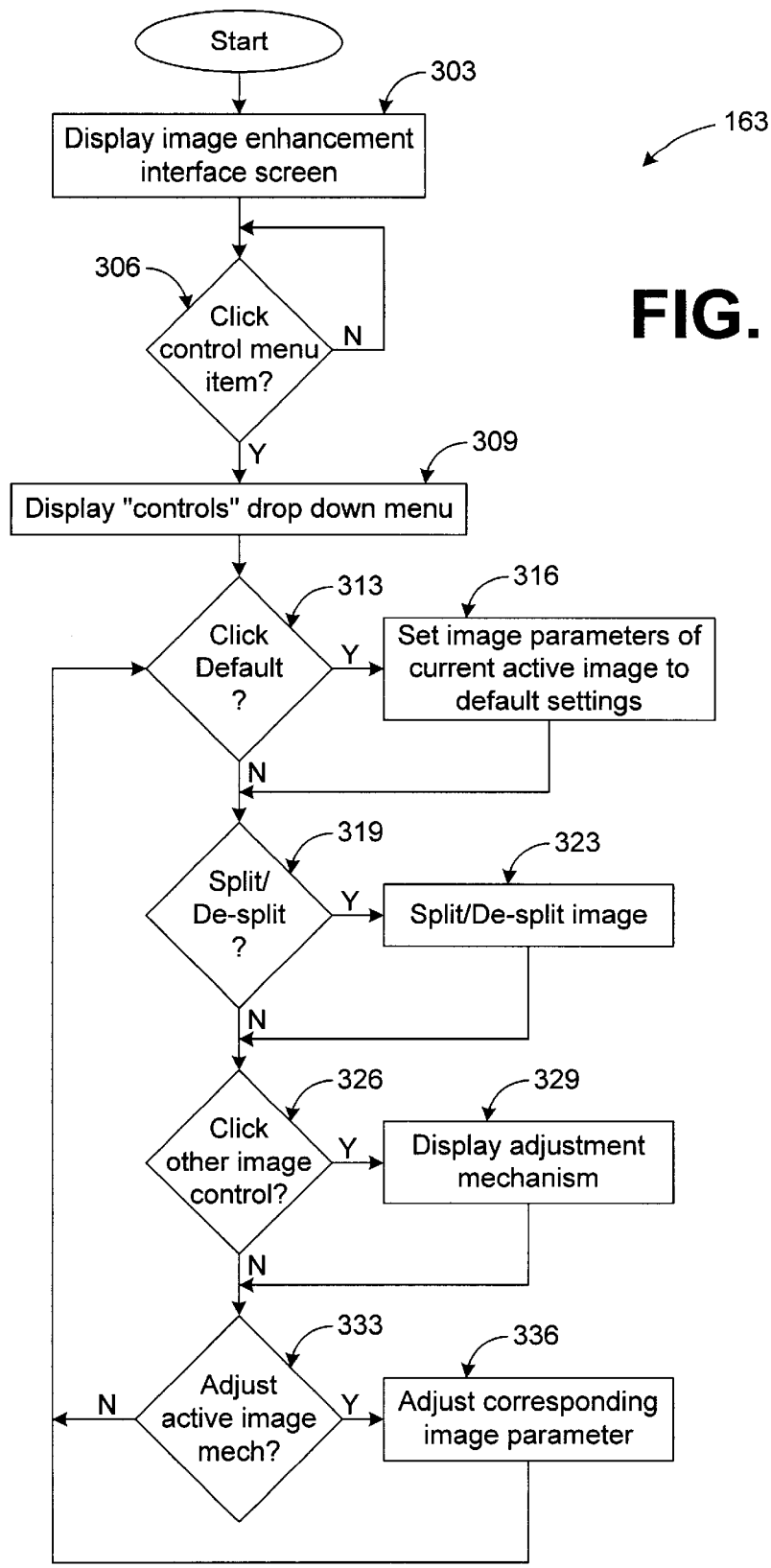
FIG. 5 is a flow chart of image enhancement logic executed by the digital image enhancement system of FIG. 1.

With reference to FIG. 5, shown is a flow chart of the image enhancement logic 163 according to an embodiment of the present invention. The image enhancement logic 163 is generally stored on the memory 109 and is executed by the processor 106, although it may also be implemented in hardware, etc. The image enhancement logic 163 generally controls the alteration of the digital image 166 based upon the manipulation of the various components of the user interface 169 as discussed previously.

Beginning with block 303, the image enhancement logic 163 causes the user interface 169 (FIG. 2) to be displayed on the display device 133 (FIG. 1). Thereafter, in block 306, the image enhancement logic 163 determines whether the user has clicked on the "controls" menu item 206 on the menu bar 209 (FIG. 3). If such is the case, then the image enhancement logic 163 progresses to block 309 in which the "controls" drop down menu 216 (FIG. 3) is displayed on the user interface 169 as shown in FIG. 3. Thereafter, in block 313, if the user clicks on the default image control 219 (FIG. 3), then the image enhancement logic 163 moves to block 316 in which the image parameters 223 (FIG. 3) of the current active digital image 166 (FIG. 3) are set to default settings corresponding to the digital image 166 as originally displayed on the user interface 169.

If the user does not click on the default image control 219 in block 313, or once the image parameters 223 of the current active digital image 166 are set to the appropriate default settings in block 316, then the image enhancement logic 163 moves on to block 319 in which it is determined whether the user has clicked the "Split" or "De-split" image controls 219. If such is the case, then the image enhancement logic 163 moves to block 323 in which the digital image 166 (FIG. 2) is Split or De-split between a single and multiple images as discussed above. After performing the functionality of block 323 or, if no "Split" or "De-split" image control 219 has been clicked in block 319, then the image enhancement logic 163 moves on to block 326.

In block 326, the image enhancement logic 163 detects whether the user has clicked on any of the remaining image controls 219. If so, then the image enhancement logic 163 moves to block 329. Otherwise, the image enhancement logic progresses to block 333. In block 329, the appropriate adjustment mechanism 226 (FIG. 3) associated with the particular image parameter 223 that was activated by clicking on the image control 219 is displayed on the user interface 169. Thereafter, the image enhancement logic 163 moves to block 333 accordingly.

In block 333, the image enhancement logic 163 determines whether an active image mechanism 226 has been adjusted by the user by manipulating a corresponding adjustment mechanism. If so, then the image enhancement logic 163 progresses to block 336 in which the corresponding image parameter 223 is adjusted accordingly. Otherwise, the image enhancement logic 163 reverts back to block 313 as shown. Note then that the image enhancement logic 163 will continually loop through blocks 313, 319, 326, and 333 until the user performs one of the actions associated therewith. In this manner, the user may adjust the nature of the digital image 166 according to the dictates of the user's taste. The user may exit the "controls" drop down menu by clicking on another button or other mechanism on the user interface 169.

In other embodiments, the image enhancement logic 163 can be implemented in hardware, software, firmware, or a combination thereof. If implemented in hardware, the image enhancement logic 163 may comprise a dedicated circuit with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

In addition, the flow chart of FIG. 5 shows the architecture, functionality, and operation of a possible implementation of the image enhancement logic 163. With respect to the embodiment of the image enhancement logic 163 in software, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as will be further clarified hereinbelow.

Also, the software embodiment of the image enhancement logic 163 comprises an ordered listing of executable instructions for implementing logical functions, can be embodied in any computer-readable medium for use by or in connection with an instruction execution system, apparatus, or device, such as a computer-based system, processorcontaining system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system for digital image enhancement, comprising:
   a processor electrically coupled to a local interface:
   a memory electrically coupled to a local interface;
   a display electrically coupled to the local interface via a display interface; and
   image enhancement logic stored in the memory and executed by the processor, the image enhancement logic including:
      logic to generate a user interface displaying at least two a digital images and at least one image parameter adjustment mechanism; and
      logic to highlight one of the digital images in the user interface;
      logic to adjust at least one image parameter of the highlighted one of the digital images in response to a manipulation of the image parameter adjustment mechanism, thereby altering the highlighted one of the digital images displayed in the user interface, wherein the user interface displays the altering of the highlighted one of the digital images concurrently with the display of the at least one image parameter adjustment mechanism.

2. The system of claim 1, wherein the logic to adjust at least one image parameter of the highlighted one of the digital images in response to a manipulation of the image parameter adjustment mechanism further comprises logic to adjust at least two image parameters based upon a multiple parameter adjustment curve.

3. The system of claim 1, wherein the logic to generate a user interface further comprises logic to generate a default mechanism, wherein a manipulation of the default mechanism sets the at least one image parameter at a default setting.

4. The system of claim 1, wherein the logic to generate a user interface further comprises logic to generate a split mechanism, wherein the at least two digital images are generated in the user interface upon a manipulation of the split mechanism, wherein each of the at least two digital images are copies of a single image displayed in the user interface before the manipulation of the split mechanism.

5. A system for digital image enhancement, comprising:
   user interface means for generating a user interface displaying at least two digital images and at least one image parameter adjustment mechanism;
   means for highlighting one of the digital images in the user interface; and
   adjustment means for adjusting at least one image parameter of the highlighted one of the digital images in response to a manipulation of the image parameter adjustment mechanism, thereby altering the highlighted one of the digital images displayed in the user interface, wherein the user interface displays the altering of the highlighted one of the digital images concurrently with the display of the at least one image parameter adjustment mechanism.

6. The system of claim 5, wherein the adjustment means further comprises means for adjusting at least two image parameters based upon a multiple parameter adjustment curve.

7. The system of claim 5, wherein the user interface means further comprises means for generating a default mechanism, wherein a manipulation of the default mechanism sets the at least one image parameter at a default setting.

8. The system of claim 5, wherein the user interface means further comprises means for generating a split mechanism, wherein the at least two digital images are generated in the user interface upon a manipulation of the split mechanism, wherein each of the at least two digital images are copies of a single image displayed in the user interface before the manipulation of the split mechanism.

9. A method for digital image enhancement, comprising the steps of:
   generating a user interface displaying at least two digital images and at least one image parameter adjustment mechanism;
   highlighting one of the digital images in the user interface; and
   adjusting at least one image parameter of the highlighted one of the digital images in response to a manipulation of the image parameter adjustment mechanism, thereby altering the highlighted one of the digital images displayed in the user interface, wherein the user interface displays the altering of the highlighted one of the digital images concurrently with the display of the at least one image parameter adjustment mechanism.

10. The method of claim 9, wherein the step of adjusting at least one image parameter of the highlighted one of the digital images in response to a manipulation of the image parameter adjustment mechanism further comprises the step of adjusting at least two image parameters based upon a multiple parameter adjustment curve.

11. The method of claim 9, further comprising the step of generating a default mechanism to set the at least one image parameter at a default setting.

12. The method of claim 9, further comprising the step of generating a split mechanism to generate the display of the at least two digital images in the user interface, wherein each of the at least two digital images are copies of a single digital image.

* * * * *